United States Patent
Bell et al.

(10) Patent No.: US 10,754,518 B1
(45) Date of Patent: Aug. 25, 2020

(54) TECHNIQUES FOR PROVIDING CUSTOMIZED USER INTERFACE COMPONENTS IN A PUSH NOTIFICATION

(71) Applicant: Amazon Technologies, Inc., Seattle, WA (US)

(72) Inventors: Christopher Ingram Bell, Bothell, WA (US); Biswadeep Das, Bangalore (IN); Anirban Ghosh, Bangalore (IN); Deepak Goyal, Bangalore (IN); Tegdeep Kondal, Seattle, WA (US); Pradeep Bangalore Manjunathaiah, Bangalore (IN); Vinay Vishwanath Rao, Bangalore (IN); Ajay Rethinasabapathi, Bangalore (IN); Vishal Mangesh Shanbhag, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 804 days.

(21) Appl. No.: 15/003,582

(22) Filed: Jan. 21, 2016

(51) Int. Cl.
  *G06F 3/0484* (2013.01)
  *H04L 29/08* (2006.01)
  (Continued)

(52) U.S. Cl.
  CPC .......... *G06F 3/04842* (2013.01); *G06T 11/60* (2013.01); *H04L 67/26* (2013.01);
  (Continued)

(58) Field of Classification Search
  CPC . G06F 3/04842; G06T 11/60; G06T 2200/24; H04M 1/72597; H04W 4/20; H04W 12/06
  See application file for complete search history.

(56) References Cited

U.S. PATENT DOCUMENTS 7,250,955 B1 * 7/2007 Beeman .................. G06F 9/542
  345/592
9,690,748 B1 * 6/2017 Roy ..................... G06F 16/957
  (Continued)

OTHER PUBLICATIONS

Author: Dave Smith Title: "Android Recipes: A Problem-Solution Approach for Android 5.0, Fourth Edition" Date: Feb. 2015 pp. Chapter 6, 1-17 (Year: 2015).*

*Primary Examiner* — Ajay M Bhatia
*Assistant Examiner* — Phoebe X Pan
(74) *Attorney, Agent, or Firm* — Kilpatrick Townsend & Stockton LLP

(57) ABSTRACT

Techniques are provided herein for utilizing a push notification action engine (e.g., a push notification action engine of a client device). The techniques include receiving a push notification comprising a structured data payload, the structured data payload comprising a specification of content to be rendered on a display of the client device. The push notification action engine generates display information in accordance with the specification and sends the display information to the operating system of the client device. Sending the display information to the operating system may cause the operating system to render a user interface component on the display of the client device. The push notification action engine may receive user input associated with the user interface component and cause execution of one or more workflows in response to receipt of the user input.

19 Claims, 13 Drawing Sheets

(51) Int. Cl.
*H04W 4/20* (2018.01)
*H04W 12/06* (2009.01)
*H04M 1/725* (2006.01)
*G06T 11/60* (2006.01)

(52) U.S. Cl.
CPC ......... *H04M 1/72597* (2013.01); *H04W 4/20* (2013.01); *H04W 12/06* (2013.01); *G06T 2200/24* (2013.01)

(56) References Cited

U.S. PATENT DOCUMENTS

| | | | | |
|---|---|---|---|---|
| 10,142,430 B1* | 11/2018 | Onnen | | H04L 67/26 |
| 10,187,486 B1* | 1/2019 | Toksoz | | H04L 67/26 |
| 2004/0194110 A1* | 9/2004 | McKee | | G06Q 10/10 |
| | | | | 719/310 |
| 2007/0082707 A1* | 4/2007 | Flynt | | G06Q 30/0276 |
| | | | | 455/564 |
| 2009/0305732 A1* | 12/2009 | Marcellino | | H04L 67/04 |
| | | | | 455/466 |
| 2012/0220263 A1* | 8/2012 | Smith | | H04W 4/60 |
| | | | | 455/410 |
| 2012/0260215 A1* | 10/2012 | Fennel | | H04W 4/50 |
| | | | | 715/825 |
| 2012/0317504 A1* | 12/2012 | Patel | | G06F 9/451 |
| | | | | 715/762 |
| 2012/0324338 A1* | 12/2012 | Meredith | | G06F 8/60 |
| | | | | 715/234 |
| 2013/0219409 A1* | 8/2013 | Woley | | G06F 9/542 |
| | | | | 719/313 |
| 2013/0281047 A1* | 10/2013 | Daly | | H04W 4/90 |
| | | | | 455/404.1 |
| 2013/0332519 A1* | 12/2013 | Walker | | H04L 67/10 |
| | | | | 709/203 |
| 2014/0047078 A1* | 2/2014 | Wilson | | H04L 67/26 |
| | | | | 709/219 |
| 2014/0047323 A1* | 2/2014 | Bourke | | G06F 17/2247 |
| | | | | 715/234 |
| 2014/0047331 A1* | 2/2014 | Feldman | | H04L 67/10 |
| | | | | 715/273 |
| 2014/0068421 A1* | 3/2014 | Bourke | | G06F 8/38 |
| | | | | 715/235 |
| 2014/0257747 A1* | 9/2014 | Repenning | | H04W 4/02 |
| | | | | 702/150 |
| 2015/0188871 A1* | 7/2015 | Lewis | | H04L 51/24 |
| | | | | 709/207 |
| 2015/0212675 A1* | 7/2015 | Firstenberg | | G06F 3/0484 |
| | | | | 715/747 |
| 2015/0242941 A1* | 8/2015 | Viswanath | | G06Q 20/40145 |
| | | | | 705/26.8 |
| 2015/0351074 A1* | 12/2015 | Vyas | | H04W 68/005 |
| | | | | 455/414.2 |
| 2017/0093998 A1* | 3/2017 | McKay | | H04W 4/26 |
| 2017/0149913 A1* | 5/2017 | Olomskiy | | H04L 67/26 |
| 2017/0168691 A1* | 6/2017 | Johansson | | G06F 9/451 |
| 2017/0315789 A1* | 11/2017 | Lam | | G06F 3/04847 |

* cited by examiner

| Data Fields | Required/ Optional | Description | Sample Value(s) |
| --- | --- | --- | --- |
| version | Optional | Version of specification format used | 1.00 |
| specificationType | Required | Rich notification specification to choose | "event," "item" |
| layout | Optional | Optimal layout for the specification. Layouts can include a single item or multiple items | Single-item |
| notificationTitle | Required | Text corresponding to a title for the push notification | "Recommended for you" |
| notificationText | Required | Text message included in the push notification | "We thought you'd like this. Check it out!!" |
| notificationCta | Required | Indicates call to action, may include a smart link or a deep link to be prefixed with SL or DL respectively | DL::com.acme.mobile.shopping://www.acme.com/gp/aw/cart/view.html |
| itemID | Required for item-based layouts | Lists the items to be included based on layout | See specification 402 of FIG. 4 |
| images | Required for image based layouts (e.g., an event) | List of images and corresponding CTAs for image-based layouts (events) | One or more instances of : "image" : "http://ecx.images-acme.com/images/I/31781CTCMB.jpg" "cta" : "DL::com.acme.mobile.shopping://www.acme.com/gp/aw/cart/view.html" |
| fallbackToText | Optional | Will fall back to text notification if true | True/false |
| validTill | Optional | Timestamp up to which this notification is valid | 2015-03-17 12:16:19 |
| buttons | Optional | List of buttons and correspond CTAs. First listed is primary button, second is secondary button | "text" : "Add to Wish List", "cta" : DL::com.acme.mobile.shopping://www.acme.com/gp/aw/wishlist/view.html" |
| fallback NotificationTitle | Optional | If rendering a rich notification, use this instead of notificationTitle | A same or different title as the notificationTitle |
| fallback NotificationText | Optional | If rendering a rich notification, use this instead of notificationText | Same or different text as the notificationText |
| fallback notificationCta | Optional | If rendering a rich notification, use this instead of notificationCta | DL::com.acme.mobile.shopping://www.acme.com/B00NP8X3TA |
| nPlus | Required for four-plus item layout | Integer value of the N+ item display | 5 |
| nPlusCta | Required for four-plus item layout | CTA when a +N more link is clicked. Prefixed by SL or DL | DL::com.acme.mobile.shopping://www.acme.com/B00NP8X3TA |
| gifImage | Optional for event layout | GIF image url inside image data field for event layout | DL::com.acme.mobile.exampleimage.gif |
| collectMetrics | Optional | Boolean value determines whether the metrics for the notification needs to be collected or not. Defaulted to true | True/false |

| Data Fields | Required/ Optional | Description | Sample Value(s) |
|---|---|---|---|
| priority | Optional | String value that determines the priority for the notification. Default is set to high | High, low, min, max, default |
| meta | Optional | Unique value to be passed in each metric | "d.meta\":[{\"msgID\":\"9999\":\"comp nId\":\"dotd\", ... |
| geoData | Optional | GeoJSON object used to set a Geofence | JSON object |
| image | Required | Image link | DL::com.acme.mobile.exampleimage.jpg |
| cta | Required | Image call to action. Prefixed with SL or DL | DL::com.acme.mobile.shopping://www.acme.com/gp/aw/cart/view.html |
| title | Optional in some layouts, required in others | Title of the item | "Bluetooth Stereo Headphones" |
| byLine | Optional | By line | "by Acme" |
| price | Optional | A price | $129.99 (42% off) |
| subject ToSubscription | Optional | Indicated whether item is subject to a subscription/membership discount | True/false |
| rating | Optional | Rating of product by a number with one decimal place | 3.5 |
| ratingCount | Optional | Customer reviews count | 200 |
| show OptionalFields | Optional | List of optional fields to show | "byLine", "price", "availability" |

FIG. 5

```
{                                                                                607
606 ──▶ "image" : "http://ecx.images-acme.com/images/I/31781CTCMB.jpg",
611 ──▶ "notificationCta" : "DL::com.acme.mobile.shopping://www.acme.com/gp/aw/
         cart/view.html",
612 ──▶ "notificationTitle" : "Recommendation for you",
615 ──▶ "notificationText" : "We thought you might be interested in this item. Check it
         out!!",
616 ──▶ "title" : "Bluetooth Stereo Headphones",
619 ──▶ "byLine" : "By Acme",
620 ──▶ "price" : "$129.99",
624 ──▶ "subjectToSubscription" : "true",
628 ──▶ "availability" : "Only 10 left in stock",
632 ──▶ "rating" : "4",
636 ──▶ "ratingCount" : "200",
640 ──▶ "showOptionalFields": ["byLine", "price", "availability", "rating", "ratingCount"],
642 ──▶ "buttons" :
        [
            {
646 ──▶     "text" : "Add to Wish List",
648 ──▶     "cta" : "DL::com.acme.mobile.shopping://www.acme.com/gp/aw/
             wishlist/view.html"
            },
            {
652 ──▶     "text" : "Buy Now",
654 ──▶     "cta" : "DL::com.acme.mobile.shopping://www.acme.com/gp/aw/
             buynow/view.html"
            },
        ]
}                                                           602
```

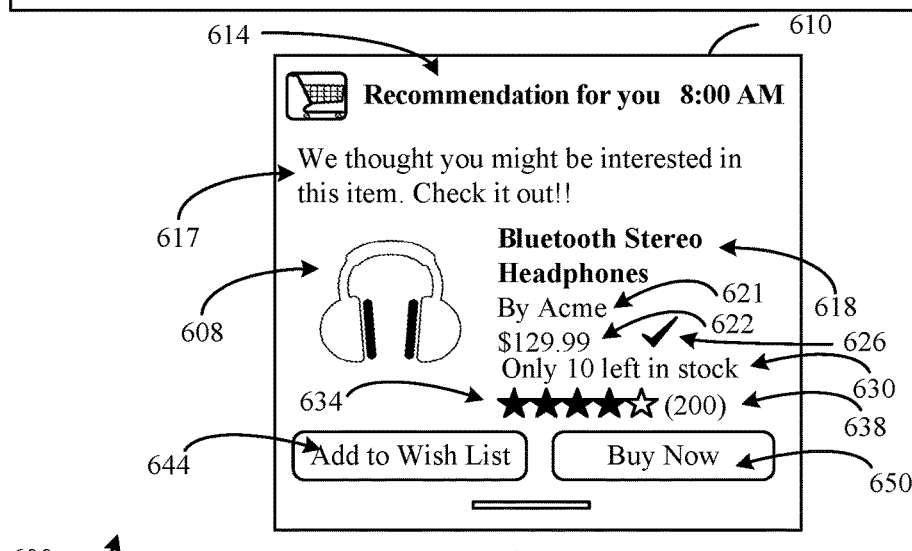

FIG. 6

```
{
        "version" : "1.1",                                              700
        "specificationType" : "item",
706 →   "layout" : "single-item",
        "content" :
708 →  {
            "notificationTitle" : "Your Cart",
            "notificationText" : "Please check your items in your cart",
            "notificationCta" : "DL::com.acme.shopping://
             www.acme.com/gp/aw/cart/view.html",
712 →       "item identifiers" :
        714 → [
                {
                    "image": "http://ecx.images-acme.com/images/I/21YK8B4NSBL.jpg",
                    "cta": "DL::com.acme.mobile.shopping://
                     www.acme.com/gp/aw/cart/view.html",
                    "title": "Taco Shell Fryer",
                    "byLine": "by Amazing Corp",
          718      "price": "$99.99",
                    "subjectToSubscription": "true",
                    "availability": "12 in stock",
                    "rating": "3.5",
                    "ratingCount": "200",
                    "showOptionalFields": ["byLine" , "price" , "availability", "rating"]
                }
        716 → ],
            "fallbackToText" : "true",
            "validTill" : "2015-04-23 15:42:19",
720 →       "buttons" :
        722 → [
                {
                    "text": "View cart",
         726        "cta" : "DL::com.acme.mobile.shopping://www.
                    acme.com/gp/aw/cart/view.html"
                },
                {
                    "text": "View Product Identifier",
         728        "cta" : "DL::com.acme.mobile.shopping://
                    www.acme.com/gp/aw/cart/view.html"
                }
        724 → ],
            "fallbackNotificationTitle" : "Some Other Title",
            "fallbackNotificationText" : "Some Other Text of Notification",
            "fallbackNotificationCta" : "DL::com.acme.mobile.shopping://
             www.acme.com/dp/B00NP8X3T4"
710 → }
}
```

FIG. 7

```
{
    "version" : "1.1",                                                      800
    "specificationType" : "item",
    "content" :
    {
        "notificationTitle" : "Your Cart",
        "notificationText" : "Please check your items in your cart",
        "notificationCta" : "DL::com.acme.mobile.shopping://
        www.acme.com/gp/aw/cart/view.html",
        "item identifier" :
        [
            {
                "image": "http://ecx.images-acme.com/images/I/21YK8B4NSBL.jpg",
                "cta": "DL::com.acme.mobile.shopping://
                www.acme.com/gp/aw/cart/view.html",
                "title": "Taco Shell Fryer"
            }
        ]
    }
}
```

TECHNIQUES FOR PROVIDING CUSTOMIZED USER INTERFACE COMPONENTS IN A PUSH NOTIFICATION

BACKGROUND

Traditionally, smartphone operating systems allow a single application to control the display as a standard operating mode. Those applications that are not actively controlling the display are sometimes said to be "running in the background" or to be "background applications," and the application controlling the display is sometimes said to be "running in the foreground" or to be the "foreground application." At times, it is desirable for background applications to be able to temporarily (e.g., modally) interrupt foreground application control of the display in order to present information (e.g., time-sensitive information) to a user. A common example is a "drop down" or "pop up" that overlays a relatively small portion of the display to present the contents of a text message sent to the user. Notifications (e.g., data messages) that are received without being explicitly requested (e.g., as part of a request-response messaging protocol) are sometimes called "push notifications." Some smartphone operating systems allow for background applications to receive push notifications. Push notifications are used in a wide range of contexts. For example, it has become commonplace for use push notifications for marketing purposes. A company may deliver messages to customers using mobile push notifications. Current techniques allow for the smartphone user to click on these push notifications which may, for example, result in the sender's mobile application being opened. This causes the application to come to the foreground and seize control of the device display, closing or pushing the previous foreground application in the background, which can frustrate a user who was engaged with the previous foreground application. Even directing the smartphone user to an intermediary page of a current foreground application can delay the user from performing operations related to the push notification, again leading to irritability and frustration for smartphone users and possibly a loss of revenue for the sender. Conventional techniques can make it cumbersome for push notification to be used in a wide variety of contexts.

BRIEF DESCRIPTION OF THE DRAWINGS

Various embodiments in accordance with the present disclosure will be described with reference to the drawings, in which:

FIGS. 4 and 5 are a table that includes example data fields that may be included in a specification of a graphical layout for rendering content on a display of a mobile device, in accordance with at least one embodiment;

FIG. 6 is a schematic diagram illustrating an example environment suitable for implementing aspects of the push notification action engine, in accordance with at least one embodiment;

FIG. 7 is an illustration of an example of a specification of a graphical layout for rendering content on a display of a mobile device, in accordance with at least one embodiment;

FIG. 8 is an illustration of another example of a specification of a graphical layout for rendering content on a display of a mobile device, in accordance with at least one embodiment;

DETAILED DESCRIPTION

Figure 1:
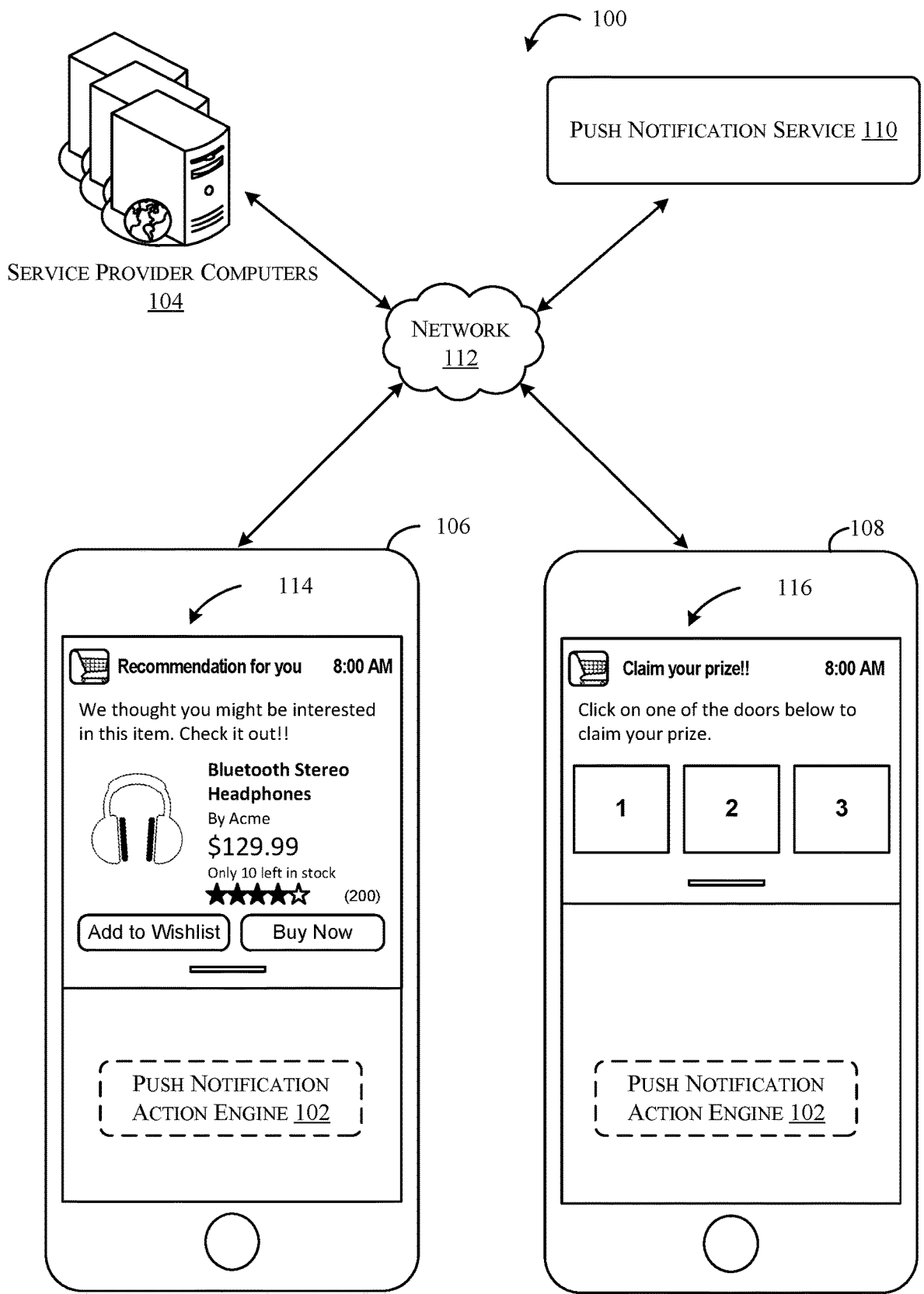
FIG. 1 is a schematic diagram illustrating an example environment suitable for implementing aspects of a push notification action engine, in accordance with at least one embodiment.

Techniques described herein are directed to providing customized user interface components utilizing a push notification action engine. Exemplary service calls may include, but are not limited to, a service call to add an item to a wish list, to purchase an item, to submit a vote, to rate an item, to rate a merchant, to submit a review, to provide billing information, to provide shipping information, to provide authentication information, to name a few. A "push notification" is intended to refer to a data message that is received without explicit request. Push notifications may be formatted according to an Apple® Push Notification Service protocol, a Mozilla® SimplePush protocol, a Google® Cloud Messaging protocol, or the like. An electronic marketplace, as used herein, is intended to refer to a computer-facilitated market for participants (e.g., buyers and sellers) to conduct transactions including commercial and/or financial transactions. An "item" is intended to refer to a product, a service, a sellable unit, or anything else that may be managed or otherwise physically or electronically stored as inventory.

In a non-limiting example, an application (e.g., a shopping application associated with an electronic marketplace provider) may execute in the background of a mobile device (e.g., as a background process). The electronic marketplace provider may determine that the mobile user is to be notified of an event via a push notification. For example, the electronic marketplace provider may determine that a mobile user is to be presented with a recommended item. Utilizing a pre-defined specification of a graphical layout for rendering content on a display of a mobile device, the electronic marketplace provider may provide content (e.g., an image, text, information needed to render a user interface component) in a structured data payload of a push notification. Upon receipt of the push notification, an operating system of the mobile device may forward the structured data payload to the application. The application may interpret the structured data payload (e.g., data fields adhering to the specification of a graphical layout for rendering content) and may perform operations to prepare the content for display on the mobile device. In some examples, preparation includes retrieving data to be displayed (e.g., an image), formatting the content for display, and/or providing rendering information interpretable by the operating system. For example, the application may provide rendering information for the "recommended item" to include an image of a recommended item, a title, an item description, a price, a "add to wish list" user interface component (e.g., a button), and a "purchase now" user interface component (e.g., another button) to be displayed in a graphical overlay on the mobile device. The application may submit the rendering information to the operating system of the mobile device to cause the operating system to display the content (e.g., in a graphical overlay). Displaying the content in a graphical overlay (e.g., a "pop up") commandeers a portion of the display, regardless of the fact that the application initiating the rendering information does not currently control the display (e.g., the application is running in the background). The mobile user may utilize the graphical overlay to ascertain information about the recommended item. In some cases, the user must interact with the "recommended item" graphical overlay before being able to proceed with other operations of the mobile device. In some examples, the mobile user may select a user interface component (e.g., the "purchase now" button) to indicate a desired action. The application may be notified by the operating system of the user's input. Accordingly, the application may execute operations that include, for example, executing a service call to a remote service operated by the electronic marketplace provider. The service call may cause a purchase transaction to be completed, resulting in the purchase of the recommended item by the mobile user. Execution of these operations may be completed while the application remains in the background of the mobile device, thus allowing the transaction to occur without bringing the application to the foreground.

In at least one embodiment, a series of graphical overlays may be utilized to allow various actions to occur. In a similar manner as described above, a mobile user may first be presented with a graphical overlay that queries the mobile user as to whether he would like to submit a review regarding a previously purchased item. Using a user interface component presented by the graphical overlay, the mobile user may indicate that he would like to submit a review. Accordingly, the mobile user may be presented with a subsequent graphical overlay that enables the user to enter review text and submit the review text using a user interface component of the subsequent graphical overlay. It should be appreciated, that any suitable number of graphical overlays may be utilized to provide the user with feedback or to enable the user to provide input. Such input may result in the execution of any suitable number of actions.

Although examples included herein may be focused contextually on e-commerce scenarios, it should be appreciated that these examples may equally apply to any suitable context including, but not limited to, financial services, social media, fraud detection, entertainment, marketing, household services, location-based services, and the like.

The techniques disclosed herein, address an internet-centric challenge of alerting a mobile user of time-sensitive information while the mobile user is offline. Such techniques additionally address latency concerns with current techniques that cause an application to be brought to the foreground upon user interaction with a graphical overlay. Transmitting push notification over a wireless communication channel to activate an application operating on the mobile device enables the connection of the mobile device to a data source over the Internet when the mobile device comes online. The techniques further herein solve an Internet-centric problem with a solution that is necessarily rooted in computer technology. Additionally, by enabling the mobile user to view customized interfaces via a graphical overlay and providing the mobile user the ability to conduct various operations using these customized interfaces, the mobile device's ability to display information and interact with the mobile user is improved.

FIG. 1 is a schematic diagram 100 illustrating an example environment suitable for implementing aspects of a push notification action engine 102, in accordance with at least one embodiment. For example, the service provider computers 104 (e.g., an electronic marketplace provider, a financial services provider, a social media provider, a polling service provider, etc.) may cause user information to be stored. "User information" may include account information (e.g., name, billing information, shipping address, preferred shipping settings, notification preferences, etc.), past purchase information, historical navigation data (e.g., selections made via an application or network page, time periods viewing a network page associated with an application or network page), historical geographical information (e.g., past GPS locations, past wireless network access information, past cellular triangulation information, etc.), or any suitable information associated with a user. User information may be collected by the service provider computers 104 as a result of any suitable interaction between a user device and a network page and/or service provided by the service provider computers 104.

The service provider computers 104, one or more user devices such as mobile device 106 and mobile device 108, and the push notification service 110 may communicate with one another via network 112. The push notification action engine 102 may be implemented as part of an application installed on a mobile device (e.g., the mobile device 106 and the mobile device 108). Network 112, and any network described herein, can include any appropriate network, including an intranet, the Internet, a cellular network, a local area network, a wide area network, or any other such network or combination thereof. The communication may be transmitted electronically or physically communicated over, for example, a telephone (e.g., using an automated service).

In accordance with at least one embodiment, the service provider computers 104 may host one or more network pages associated with an electronic marketplace. A user of mobile device 106 and/or mobile device 108 may interact with the hosted network pages to provide account information. Such account information may be submitted by the user using a mobile device or any suitable computing device. For example, a user may enter in account information during a registration process of the electronic marketplace. The user, as part of the registration process, or at another suitable time, may indicate that he wishes to receive push notifications associated with a particular application. Additionally, the user may indicate, via a setting of the mobile device, that push notifications are desired for a particular application.

As a non-limiting example, the service provider computers 104 may determine that one or more items offered on the electronic marketplace should be recommended to the user. The service provider computers 104 may cause information related to the recommendation to be provided to the application. Utilizing a pre-defined specification of a graphical layout for rendering content on a display of a mobile device, the service provider computers 104 may embed information pertaining to the recommendation in a structured data payload of a push notification request. The service provider computers 104 may communicate the push notification request to the push notification service 110, a service responsible for disseminating push notifications to mobile devices using a standard push notification protocol.

The push notification service 110 may communicate a push notification corresponding to the push notification request to a mobile device 106 (e.g., a mobile device associated with the user). The push notification may be received by the operating system of the mobile device 106 and forwarded to an application that is installed on mobile device 106. The application may be identified in the push notification payload. The application, in this example, may be a shopping application associated with the electronic marketplace provider.

The application may interpret the payload of the received push notification in order to ascertain recommendation information to be displayed on the device. The application may then retrieve recommendation data (e.g., via a hypertext link) and/or format the recommendation information to produce rendering information that is interpretable by rendering features of the operating system. The application may send the rendering information to the operating system, causing the operating system to display the recommendation on the mobile device 106 (e.g., via a graphical overlay).

As an illustrative example, a graphical user interface component 114 may be displayed (e.g., as a "pop up" window). The graphical user interface component 114 may include a title (e.g., "Recommendation for you"), a time of display (e.g., 8:00 AM), text (e.g., "We thought you might be interest in this item. Check it out!!"), an image (e.g., an image of the recommended item, in this case, Bluetooth stereo headphones), an item name (e.g., Bluetooth stereo headphones), a manufacturer (e.g., indicating that the item is manufactured "by Acme"), a price (e.g., $129.99), a stocking quantity (e.g., indicating that there are only ten items left in stock), a rating (e.g., four out of five stars), a review count (e.g., indicating that there are 200 reviews of the recommended item), and two user interface components (e.g., an "add to wish list" button and a "buy now" button). The user may view the graphical user interface component 114 to ascertain information about the Bluetooth stereo headphones. In at least one example, the user may decide he wishes to purchase the headphones. The user may select the "buy now" button included in the graphical user interface component 114. The application may be notified of the user's selection and may determine an action to execute in response to the selection. In this example, the application may execute a service call that is configured to cause a purchase transaction to occur on a remote server. The purchase transaction may utilize previously stored billing information or, in some cases, the user may be prompted for billing information via a subsequent graphical overlay initiated by the application and communicated to the operating system. Once the transaction has occurred, the application may further cause a subsequent graphical user interface component to be presented to the user indicating the completion of the order.

As a further example, the service provider computers 104 may determine that a promotional deal should be provided to the user via a graphical user interface component. In a similar manner as described above, the service provider computers 104 may embed promotional deal information in a push notification request in accordance with a specification for displaying a promotional deal on a user device. Following a similar process as described above, the application may cause a graphical user interface component 116 to be displayed on the mobile device 108 in order to advertise the promotional deal. The mobile device 108 may be the same or different mobile device as the mobile device 106. As can be seen in FIG. 1, the graphical user interface component 116 may include a title (e.g., "Claim your prize!!"), a time of display (e.g., 8:00 AM), text (e.g., "Click on one of the doors below to claim your prices"), and three user interface components (e.g., graphical representations of doors labeled "1", "2", and "3"). In this example, the user can select one of the user interface components (e.g., door "1"). The application, upon receiving such user input, may cause an additional graphical overlay to be displayed to the user indicating that the user has won a $20.00 gift card. The application, in this example, may further execute a service call in order to cause the service provider computers 104 to apply a $20.00 credit to the user's account. The graphical user interface component 114 and the graphical user interface component 116 are each examples of graphical overlays. For example, the graphical user interface component 114 and the graphical user interface component 116 appear to be visually positioned over an underlying graphical user interface that has been caused or maintained by a current foreground application.

Figure 2:
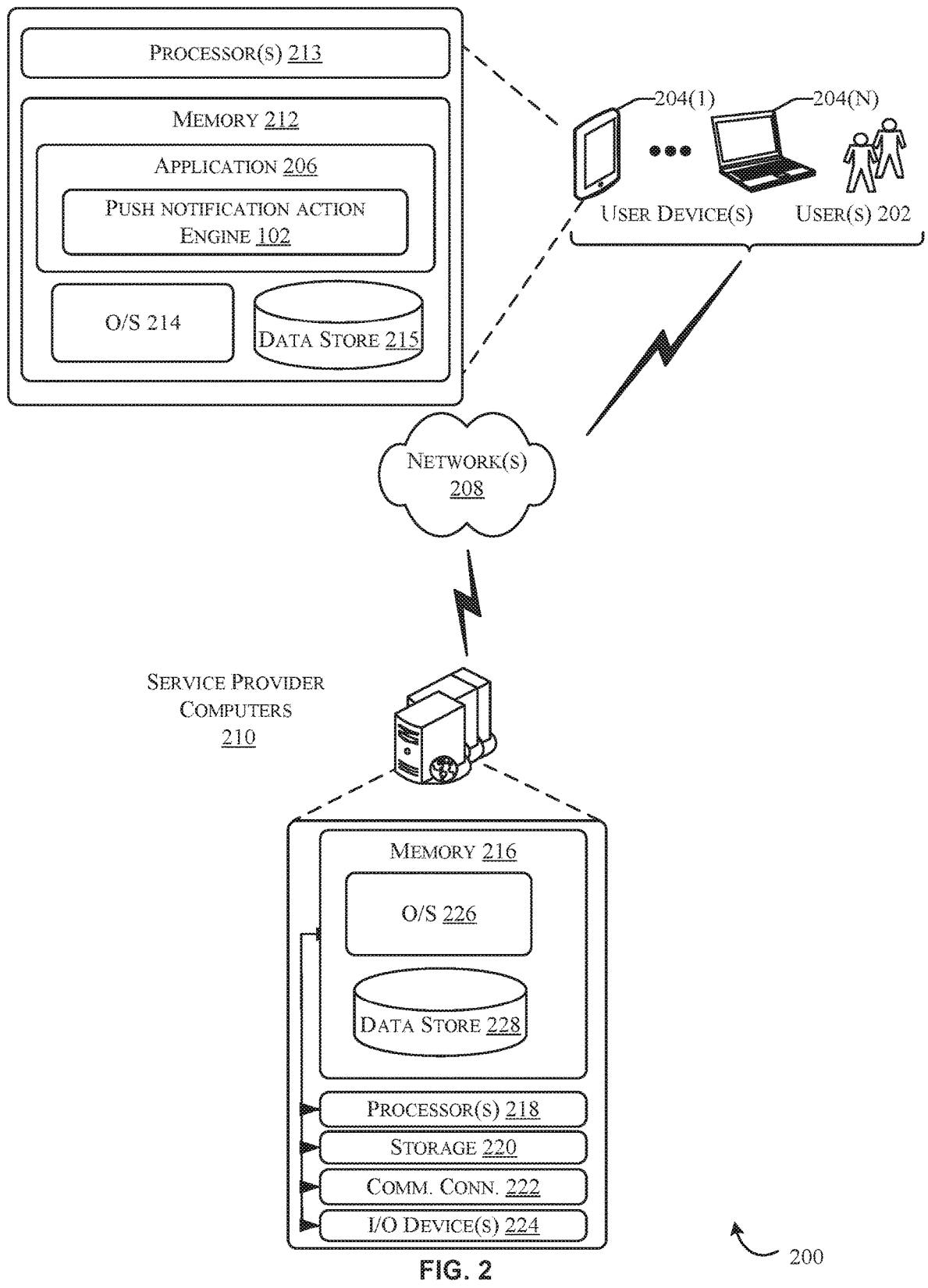
FIG. 2 is an example architecture of the push notification action engine, in accordance with at least one embodiment.

FIG. 2 is an example architecture 200 of the push notification action engine 102 of FIG. 1, in accordance with at least one embodiment. In architecture 200, one or more users 202 may utilize user computing devices 204(1)-(N) (collectively, user computing devices 204, e.g., the mobile device 106 and/or the mobile device 108 of FIG. 1) to access an application 206 (e.g., an application operating on the mobile device 106, possibly in the background) or a user interface accessible through the application 206 via one or more networks 208 (e.g., the network 112 of FIG. 1). In some aspects, the application 206 may be hosted, managed, and/or provided by a computing resources service or service provider, such as by utilizing one or more service provider computers 210.

In some examples, the networks 208 may include any one or a combination of many different types of networks, such as cable networks, the Internet, wireless networks, cellular networks, and other private and/or public networks. While the illustrated example represents the users 202 accessing the application 206 over the networks 208, the described techniques may equally apply in instances where the users 202 interact with the service provider computers 210 via the one or more user computing devices 204 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 206 may allow the users 202 to interact with the service provider computers 210 (e.g., service provider computers 104 of FIG. 1) such as to access information associated with items being sold via an electronic marketplace. The application 206 may additionally, or alternatively interact with the service provider computers 210 to access information related to financial services (e.g., bank accounts, credit cards, retirement funds, etc.), entertainment (e.g., information related to movie show times/locations and ticket information, electronic media stores, etc.), or any suitable information capable of being stored on the service provider computers 210. The service provider computers 210, perhaps arranged in a cluster of servers or as a server farm, may host the application 206 and/or cloud-based software services. Other server architectures may also be used to host the application 206 and/or cloud-based software services. The application 206 may be capable of handling requests from many users 202 and serving, in response, various user interfaces that can be rendered at the user computing devices 204. The application 206 can present any suitable type of website that supports user interaction, including search engine sites. The described techniques can similarly be implemented outside of the application 206, such as with other applications running on the user computing devices 204.

The user computing devices 204 (e.g., the mobile device 106 and the mobile device 108 of FIG. 1) may be any suitable type of computing device such as, but not limited to, a mobile phone, a smartphone, a personal digital assistant (PDA), a laptop computer, a desktop computer, a thin-client device, a tablet PC, an electronic book (e-book) reader, etc. In some examples, the user computing devices 204 may be in communication with the service provider computers 210 via the networks 208, or via other network connections.

In one illustrative configuration, the user computing devices 204 may include at least one memory 212 and one or more processing units (or processor(s)) 213. The processor(s) 213 may be implemented as appropriate in hardware, computer-executable instructions, firmware, or combinations thereof. Computer-executable instruction or firmware implementations of the processor(s) 213 may include computer-executable or machine-executable instructions written in any suitable programming language to perform the various functions described.

The memory 212 may store program instructions that are loadable and executable on the processor(s) 213, as well as data generated during the execution of these programs. The memory 216 may include an operating system 214, one or more data stores 215, and/or one or more application programs, modules, or services for implementing the features disclosed herein including one or more features of the push notification action engine 102 of FIG. 1. Depending on the configuration and type of user computing device, the memory 212 may be volatile (such as random access memory (RAM)) and/or non-volatile (such as read-only memory (ROM), flash memory, etc.). The user computing devices 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein, such as via the application 206 (e.g., a smart phone application, a tablet application, etc.). The application 206 may be configured to receive, store, and/or display a network page or other interface for interacting with the service provider computers 210. The application 206 may further be configured to interpret received push notifications, provide rendering information and/or graphical overlay information to the operating system, and execute service calls directed to, for example, the service provider computers 210. Additionally, the memory 212 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the service provider computers 210 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 210 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 210 may be in communication with the user computing devices 204 and/or other service providers via the networks 208 or via other network connections. The service provider computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the service provider computers 210 may include at least one memory 216 and one or more processing units (or processor(s)) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described.

The memory 216 may store program instructions that are loadable and executable on the processor(s) 218, as well as data generated during the execution of these programs. Depending on the configuration and type of service provider computers 210, the memory 216 may be volatile (such as RAM) and/or non-volatile (such as ROM, flash memory, etc.). The service provider computers 210 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 216 may include multiple different types of memory, such as SRAM, DRAM, or ROM.

The memory 216, the additional storage 220, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are all examples of computer storage media. Additional types of computer storage media that may be present in the service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 210 may also contain communications connection(s) 222 that allow the service provider computers 210 to communicate with a stored database, another computing device or server, user terminals and/or other devices on the networks 208. The service provider computers 210 may also include I/O device(s) 224, such as a keyboard, a mouse, a pen, a voice input device, a touch input device, a display, speakers, a printer, etc.

Turning to the contents of the memory 216 in more detail and will be described in further detail in FIG. 3, the memory 216 may include an operating system 226, one or more data stores 228, and/or one or more application programs, modules, or services for implementing the features disclosed herein.

Figure 3:
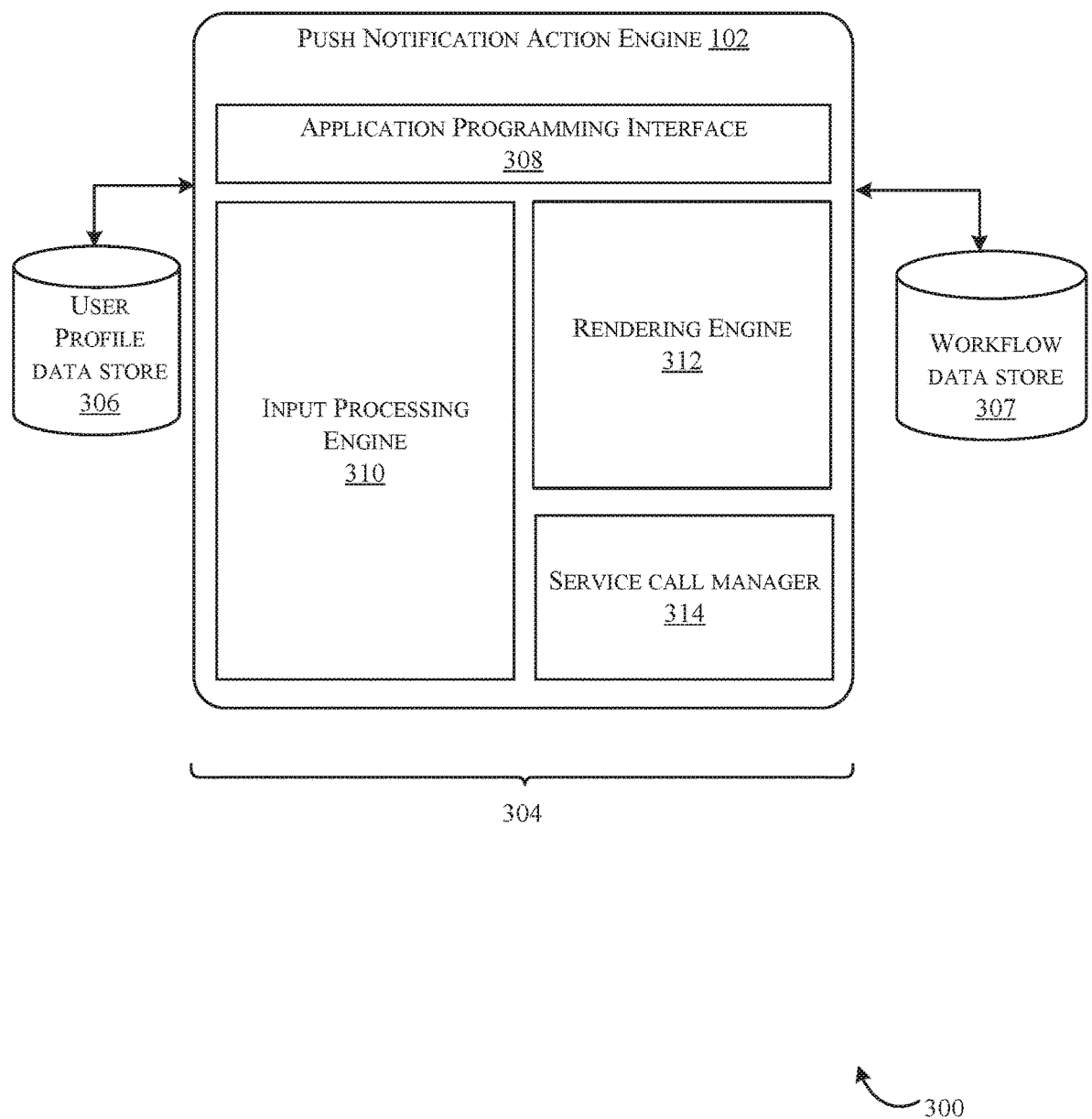
FIG. 3 is a schematic diagram of the push notification action engine, in accordance with at least one embodiment.

FIG. 3 schematically illustrates an example computer architecture 300 for the push notification action engine 102 of FIG. 1, including a plurality of modules 304 that may carry out various embodiments. The modules 304 may be software modules, hardware modules, or a combination thereof. If the modules 304 are software modules, the modules 304 can be embodied on a computer readable medium and processed by a processor in any of the computer systems described herein. It should be noted that any module or data store described herein, may be, in some embodiments, a service responsible for managing data of the type required to make corresponding calculations. The modules 304 may be configured in the manner suggested in FIG. 3 or the modules 304 may exist as separate modules or services external to the push notification action engine 102. Any combination of modules 304 may be executed, in whole or in part, on service provider computers 302 (e.g., service provider computers 210 of FIG. 2). Likewise, any combination of modules 304 may be executed, in whole or in part, on user device 303 (e.g., the user computing devices 204 of FIG. 2), for example, as part of an application executing on user device(s) 303 (e.g., the application 206 of FIG. 2).

In the embodiment shown in the drawings, a user profile data store 306 and workflow data store 307 are shown, although data can be maintained, derived, or otherwise accessed from various data stores, either remote or local to the push notification action engine 102, to achieve the functions described herein. Some combination of the data stores depicted in FIG. 3 may be located on the service provider computers 210 of FIG. 2 and/or may be located on the user device(s) 202 of FIG. 2. The push notification action engine 102, as shown in FIG. 3, includes various modules such as an application programming interface 308, an input processing engine 310, a rendering engine 312, and a service call manager 314. Some functions of the modules 308, 310, 312, and 314 are described below. However, for the benefit of the reader, a brief, non-limiting description of each of the modules is provided in the following paragraphs.

In accordance with at least one embodiment, a process is enabled for utilizing the push notification action engine 102 of FIG. 1. For example, a user may utilize a mobile device to interact with the service provider computers 210 via a network (e.g., the network 112 of FIG. 1). For example, the user may register or otherwise provide account information.

Additionally, the user may enter subscription information related to push notifications. "Subscription information" is intended to include information related to a category of notifications (e.g., a topic category) that the user wishes to receive. Topic categories relate to a particular merchant (e.g., any services/items offered by merchant A), a particular service (e.g., recommended items, fraud detection, promotional deals, entertainment suggestions, etc.), an item (e.g., price fluctuations for a particular item), a particular device (e.g., a device provided by an electronic marketplace provider), and/or a geographical area (e.g., a zip code, a city, a user-specified radial distance corresponding to the user's current location, a user-specified location, etc.). As part of a user registration process, or at any suitable time, subscription information regarding user notification preferences may be received by the service provider computers. Such information may be provided to, or otherwise accessible by, the mobile device. For example, the subscription information may be stored in the user profile data store 306, locally on the mobile device, or otherwise accessible to the mobile device.

In at least one embodiment, application programming interface 308 may be utilized in any suitable example described herein as a means for receiving by, or providing information by, the push notification action engine 102.

The input processing engine 310, a component of the push notification action engine 102, may be configured to receive a data message that has not previously been requested (e.g., a push notification). Upon receipt, the input processing engine 310 may be configured to extract a structured data payload from the data message and communicate the structured data payload to a rendering engine 312. The input processing engine 310 may further be configured to receive user input related to a data message (e.g., user input entered via a user interface component presented in a graphical overlay that corresponds to the push notification). The input processing engine 310 may be furthered configured to communicate the user input to service call manager (e.g., to execute a service call) or to the rendering engine 312 (e.g., to generate a graphical user interface component in response to the user input). The input processing engine 310 may be further configured to determine from the user input, one or more workflows to execute as a result of the user input. For example, a feedback message may be generated by the input processing engine 310 and communicated to the rendering engine 312 in order to provide the feedback via a graphical user interface component. Similarly, the input processing engine 310 may receive user input and determine that further input is required (e.g., authentication information, a specific quantity, billing information acknowledgement, payment authorization, etc.). In this case the input processing engine 310 may generate a user prompt message and communicate the user prompt message to the rendering engine 312 in order for the user prompt message to be provided via a graphical user interface component (e.g., via a graphical overlay). The input processing engine 310 may further be configured to receive information from a specific-purpose device. For example, a specific purpose device may include a device issued by an electronic marketplace provider to track item usage and automatically reorder the item when it is determined that the item quantity is low. The input processing engine may be further configured to store structured data payload, data message information, and/or user input in workflow data store 307, a data store responsible for maintaining a record the structured data payload and a workflow related to a received data message (e.g., a push notification).

In accordance with at least one embodiment, the rendering engine 312, a component of the push notification action engine 102, may receive a structured data payload associated with a received data message that had has been requested (e.g., a push notification). The rendering engine 312 may process the structured data payload according to a specification for the structured data payload. The specification may include a number of data fields that are interpretable by the rendering engine 312. The rendering engine 312 may retrieve information (e.g., an image accessible via a network) at a location identified by a data field of the structured data payload. The rendering engine 312 may generate rendering information in accordance with the structured data payload. The rendering information may include instructions for rendering one or more graphical user interface components (e.g., an image, text, a button, an edit box, etc.) using rendering features of the operating system (e.g., a graphical overlay feature of the operating system). The rendering engine 312 may be configured communicate the rendering information to the operating system of the mobile device.

In accordance with at least one embodiment, the service call manager 314 may be configured to receive user input data from the input processing engine 310. The service call manager 314 may be configured to retrieve a structured data payload corresponding to the graphical user interface component (e.g., a graphical overlay) corresponding to the user input. The service call manager 314, in some cases utilizing the structured data payload, may determine one or more service calls to be executed. The service call manager 314 may be configured to cause execution of the one or more service calls which may result in one or more operations being performed by the service provider computers 210.

FIGS. 4 and 5 include tables (e.g., table 400 and table 500, respectively) that provide example data fields that may be included in a specification of a graphical layout for rendering content on a display of a mobile device, in accordance with at least one embodiment. For example, the table 400 may include data fields 402. The data fields 402 may include a "version" data field, a "specificationType" data field, a "layout" data field, a "notificationTitle data field, a "notificationText" data field, a "notificationCta" data field, an "itemID" data field, an "image" data field, a "fallbackToText" data field, a "validTill" data field, a "buttons" data field, a "fallbackNotificationTitle" data field, a "fallbackNotificationText" data field, a "fallbackNotificationCta" data field, an "nPlus" data field, an "nPlusCta" data field, a "gifImage" data field, and a "collectMetrics" data field. Similarly, table 500 may include data fields 502. Specifically, the data fields 502 may include, a "priority" data field, a "meta" data field, a "geoData" data field, an "image" data field, a "cta" data field, a "title" data field, a "byLine" data field, a "price" data field, a "subjectToSubscription" data field, a "rating" data field, a "ratingCount" data field, and a "showOptionalFields" data field. Column 404 of FIG. 4 and column 504 of FIG. 5 includes indicators for identifying which of the data fields 402 and the data fields 502 are required and which are optional. The columns 406 of FIG. 4 and 506 of FIG. 5 may include a description of each of the data fields 402 and the data fields 502. The column 408 of FIG. 4 and the column 508 of FIG. 5 may include sample value(s) of the corresponding data fields 402 and data fields 502. Any suitable combination of the data fields 402 and/or the data fields 502 may be included in a specification of a graphical layout for rendering content on a display of a user device using a push notification. Additional data fields may be included in the set of defined data fields, the data fields 402 and the data fields 502 are not intended to be an exhaustive list. Example specifications utilizing the data fields 402 and the data fields 502 are provided herein. It should be appreciated that these examples are non-limiting in nature.

FIG. 6 is a schematic diagram illustrating an example environment 600 suitable for implementing aspects of the push notification action engine 102 of FIG. 3, in accordance with at least one embodiment. The environment 600 may include a specification 602 for rendering content on a display of a user device (e.g., utilizing a push notification). The specification 602 may include data fields 604. Some of the data fields 604 may define a particular display detail of a push notification. Additionally, some of the data fields 604 may define an action (e.g., a service call). The specification 602 may be defined using an extensible markup language (XML) or data-interchange format or a JavaScript Object Notation (JSON), for example. In the exampled depicted in FIG. 6, JSON is used to define the specification 602.

The data fields 604 of FIG. 6 may include the data fields depicted in FIG. 6 or another combination of such fields. In the example depicted in FIG. 6, the specification 602 includes an "image" data field 606 that is associated with an image (e.g., a JPEG image) that is associated with a location defined by a hyperlink 607. The "image" data field 606 corresponds to the image 608 displayed in exemplary graphical overlay 610. The "cta" data field 611 may correspond to the image 608 defined by the "image" data filed 606. For example, if the user were to select the image in exemplary graphical overlay 610, an application may execute the deep link associated with the "cta" data field 611. In at least one example, the deep link may correspond to a service call related to a service provider. For example, the deep link may execute a service call that results in mapping, or otherwise associating, the item corresponding to the image 608 to an electronic shopping cart associated with the user.

The specification 602 may further include a "notificationTitle" data field 612 that corresponds with text 614 displayed in exemplary graphical overlay 610. A "notificationText" data field 615 may correspond to text 617 of exemplary graphical overlay 610. A "title" data field 616 may correspond to text 618 of exemplary graphical overlay 610. A "byLine" data field 619 may correspond to text 621 of exemplary graphical overlay 610. The "price" data field 620 may correspond with the price 622 of exemplary graphical overlay 610. The specification 602 may further include a "subjectToSubscription" data field 624 that may correspond to an icon 626. The icon 626 may indicate that the item is subject to a membership subscription program such as a membership subscription that provides subscribers discount shipping rates, for example. The "availability" data field 628 may correspond to text 630, which indicates a stocking quantity (e.g., 10 items left in stock). The specification 602 may further include a "rating" data field 632 that corresponds with icons 634 that indicate a rating associated with the item. The "ratingCount" data field 636 may correspond with number indicating how many reviews have been given for the item depicted in image 608. The number may be depicted by text 638 in exemplary graphical overlay 610. A "showOptionalFields" data field 640 may be included in the specification 602 to provide a mechanism for indicating which optional data fields will be utilized by exemplary graphical overlay 610. In this example, the "showOptionalFields" data field 640 indicates that the "byLine" data field 616, the "price" data field 620, the "availability" data field 628, and the "rating" data field 632 may be utilized in exemplary graphical overlay 610.

In at least one embodiment, the specification 602 may include user interface component definitions such as definition 642 related to "buttons" to be provided in exemplary graphical overlay 610. For example, button 644 may correspond to "text" data field 646 and "cta" data field 648. In at least one example, button 644 may include the text "Add to Wish List" according to the association to the "text" data field 646. Upon selection, an action corresponding to the "cta" data field 648 may be executed. For example, upon selecting the button 644, a service call may be executed causing the item associated with the image 608 to be added to an electronic wish list. Button 650 may correspond to "text" data field 652 and "cta" data field 654. In at least one example, the button 650 may include the text "Buy Now" according to the association to the "text" data field 652. Upon selection, an action corresponding to the "cta" data field 654 may be executed causing a purchase transaction to be initiated for the item associated with the image 608.

FIG. 7 is an illustration of an example of a specification 700 for rendering content on a display of a mobile device, in accordance with at least one embodiment. Specification 700 may include any suitable combination of the data fields 502 and/or the data fields 604 of FIGS. 5 and 6. A content section 706 of the specification 700 is depicted. The content section 706 may include the data fields encompassed by bracket 708 and bracket 710. An item identifiers section 712 may be included in the content section 706. The item identifiers section 712, beginning at bracket 714 and ending at bracket 716, may include one or more sets of data fields, such as the set of data fields 718. The set of data fields 718 may correspond to data fields related to a single item. The content section 706 may further include a buttons section 720. The buttons section 720 begins at bracket 722 and ends at bracket 724. One or more button definition sets (e.g., the button definition set 726 and the button definition set 728) may be included in the buttons section 720. A definition set (e.g., the button definition set 726) defines data fields corresponding to a button (a user interface component) to be displayed in a graphical overlay according to the specification 700.

As a non-limiting example, the specification 700 may be utilized to provide a graphical user interface component (e.g., a graphical overlay) that includes a single-item image. The push notification may be titled "Your Cart" wish descriptive text displayed including "Please check your items in your cart." The graphical user interface component may be associated with a deep link that corresponds to a data location constituting the user's electronic shopping cart. The item identifiers section 712 indicates that a single item (e.g., a Taco Shell Fryer) will be displayed for a graphical user interface component corresponding to the specification 700. The graphical user interface component which corresponds to the specification 700 may be displayed similarly as that of the exemplary graphical overlay 610 of FIG. 6, albeit with different values for the data fields. In at least one example, the specification 700 includes maximum number of unique fields (e.g., a superset of the required and optional fields) for an "item" specification type in accordance with the tables of FIGS. 5 and 6. Although, as discussed above, there may be duplicate data fields included in the specification 700 (e.g., multiple sets of data fields corresponding to multiple items).

FIG. 8 is an illustration of another example of a specification 800 for rendering content on a display of a mobile device, in accordance with at least one embodiment. The specification 800 may include a minimum combination of data fields corresponding to the required data fields for a specification having an "item" specification type. Specifically, required data fields include, a "version" data field, a "specificationType" data field, a "notificationTitle" data field, a "notificationText" data field, a "notificationCta" data field, an "image" data field, a "cta" data field, and a "title" data field. These required fields may be nested within a content section and an item identifier section as depicted in FIG. 9.

Figure 9:
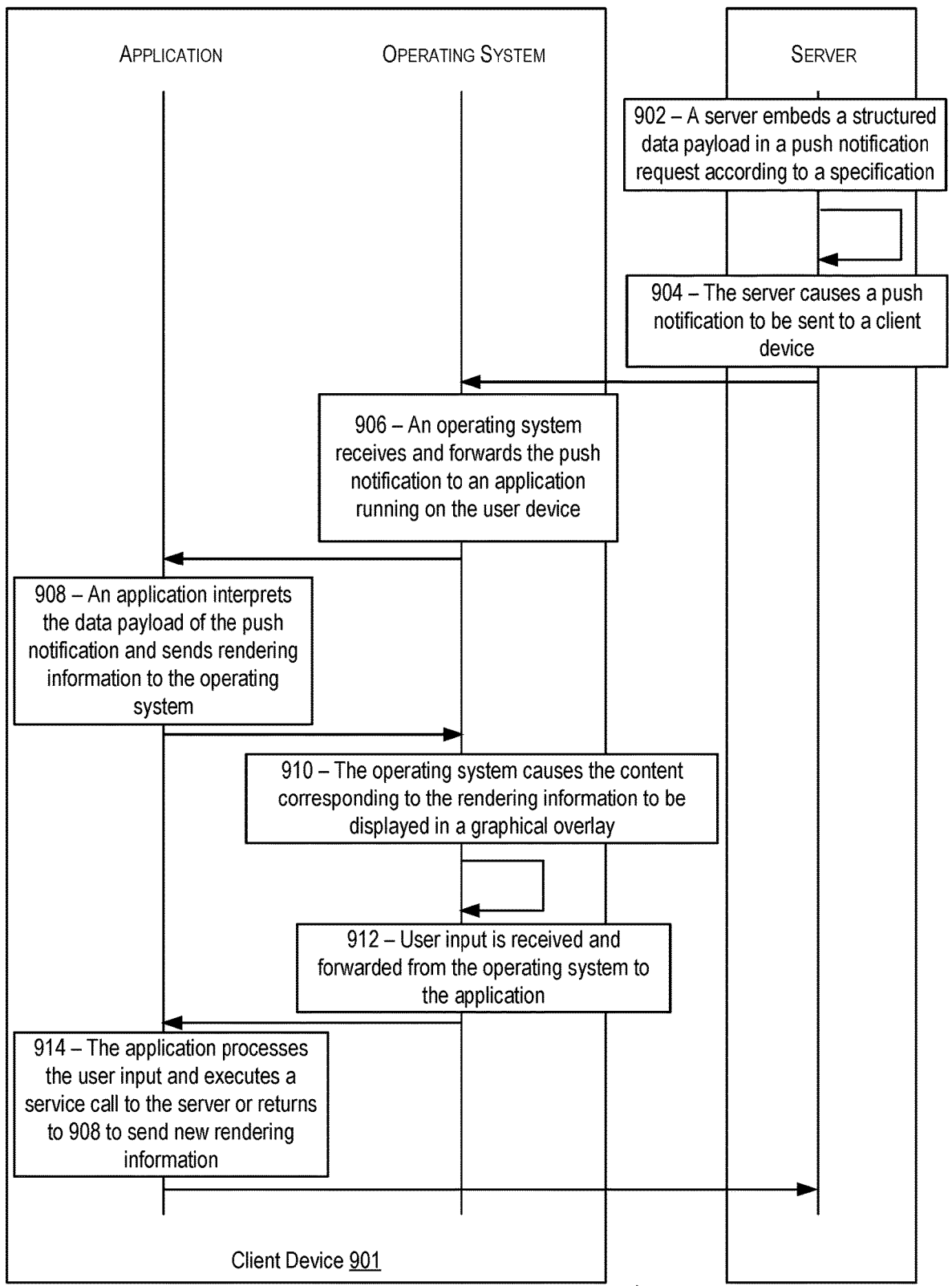
FIG. 9 is a schematic diagram of an example protocol for providing customized user interface components in a graphical overlay, in accordance with at least one embodiment.

FIG. 9 is a schematic diagram of an example protocol 900 for initiating an action utilizing a graphical overlay, in accordance with at least one embodiment. The protocol 900 may begin at 902, where a server device embeds a structured data payload in a push notification according to a specification (e.g., the specifications of FIG. 6-8) for rendering content on a display of a client device 901. The client device 901 includes an operating system and an application. At 904, the service causes a push notification to be sent to a client device 901. In at least one example, the service sends the push notification request to a push notification service (e.g., the push notification service 110 of FIG. 1), the push notification request including the structured data payload. The push notification service 110 may identify the client device corresponding to the push notification request and send the structured data payload in a data message to the client device 901. At 906, an operating system of the client device 901 receives the data message. The operating system may identify an application addressed in the data message and forward a portion of the data message to the identified application. The application may be running in the background, or in other words, the application may not be actively in control of the device display. At 908, the application, without commandeering control of the device display, interprets the data payload of the data message and sends rendering information to the operating system. At 910, the operating system causes the content corresponding to the rendering information to be displayed (e.g., in a graphical overlay of a portion of the display). At 912, user input is received and forwarded from the operating system to the application. For example, user input can include a selection of one or more user interface components, a submission of textual input, a submission of biometric input, or the like. At 914, the application processes the user input and executes an action, for example, resulting in a service call to the server. In some examples, the application processes the user input and generates further rendering information that will be sent to the operating system and eventually displayed on the client device 901 (e.g., via a graphical overlay).

Figure 10:
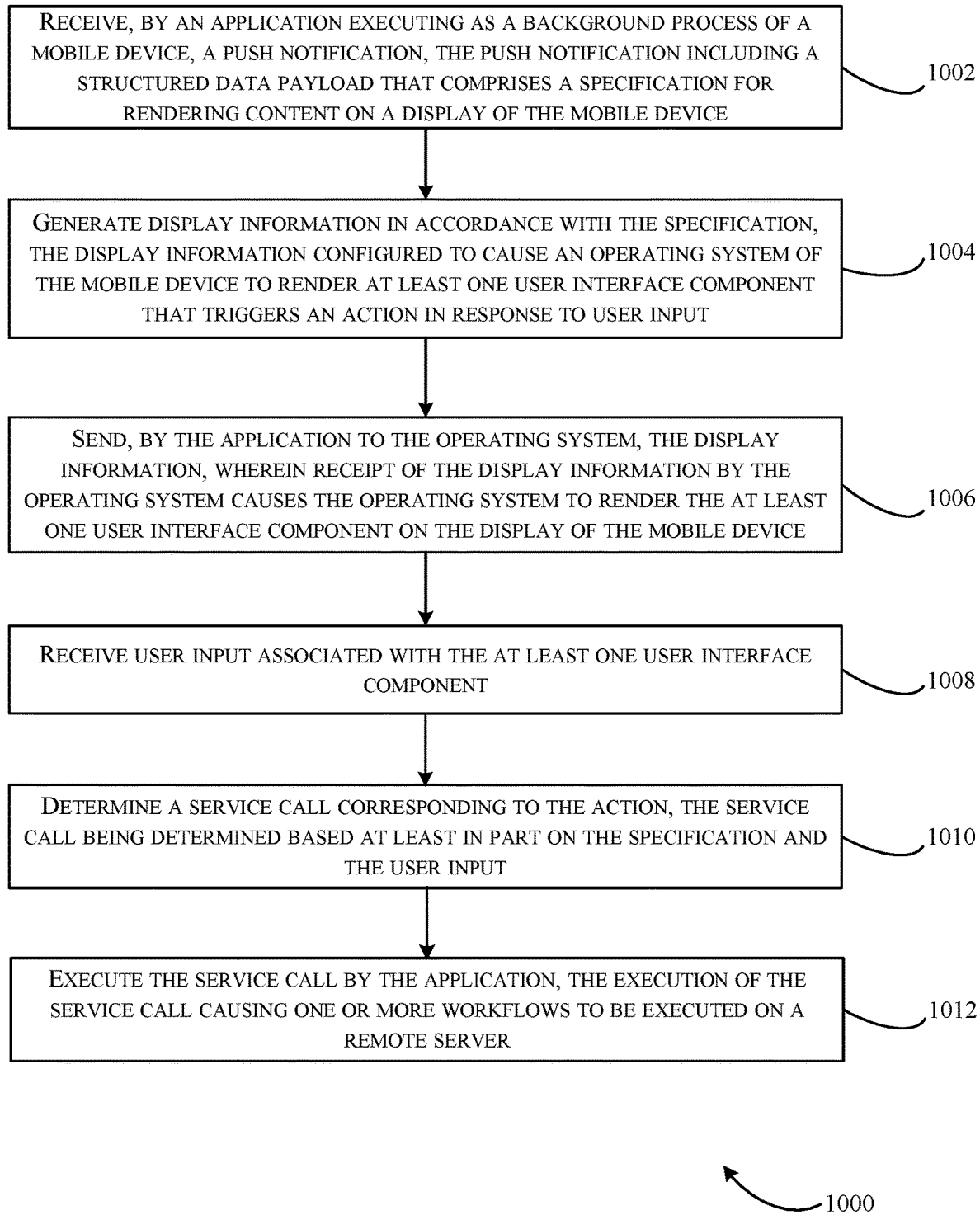
FIG. 10 is a flowchart illustrating an example method for providing customized user interface components in a graphical overlay utilizing the push notification action engine, in accordance with at least one embodiment.

FIG. 10 is a flowchart illustrating an example method 1000 for providing customized user interface components in a graphical overlay utilizing the push notification action engine (e.g., the push notification action engine 102 of FIG. 3), in accordance with at least one embodiment. The method 1000 may begin at block 1002, where the push notification action engine 102 (part of an application of the client device) receives a data message that has not been requested (e.g., a push notification received by the input processing engine 310 of FIG. 3). In at least one example, the data message may include a structured data payload that comprises a specification of a graphical layout for rendering content on a display of a mobile device.

At 1004, the push notification action engine 102 may generate, display information in accordance with the specification. The display information may configured to cause an operating system of the mobile device to render at least one user interface component that triggers an action in response to user input. The specification defines the action to be taken in response to the user input.

At 1006, the push notification action engine 102 may send the display information to the operating system. The receipt of the display information by the operating system may cause the operating system to render the at least one user interface component on the display of the mobile device (e.g., via a graphical overlay).

At 1008, the push notification action engine 102 may receive user input associated with the at least one user interface component. For example, the user interface components presented by the operating system (e.g., via the graphical overlay) may include a button, or edit box, or any suitable user interface component configured to enable interaction with the user. The user may, for example, select a button (e.g., a "buy now") button. The selection may comprise the whole of the user input, or the selection and/or additionally submitted information (e.g., text, a number, etc.) may be included in the user input.

At 1010, the push notification action engine 102 may determine a service call corresponding to the action, the service call being determined based at least in part on the specification and the user input. In some cases the service call may be identifiable by using the action (identified by the user input) to look up a service call defined in the specification.

At 1012, the push notification action engine 102, may execute the service call by the application. The execution of the service call may cause one or more workflows to be executed on a remote server.

As a non-limited example, the service provider computers 210 of FIG. 2 may comprise server computing resources of a financial institution (e.g., a bank). The bank may determine that a user's account includes suspicious information. For example, a transaction having an unusually large amount may be pending for the account. The service provider computers 210 may determine that the account holder need be informed of the pending transaction. Accordingly, the service provider computers 210 may provide display information (e.g., textual description describing the financial transaction, a title, and two buttons such as a button for approving the transaction, and a button for indicating that the transaction is fraudulent). In at least one example, the service provider computers 210 may embed the display information in the structured data payload of a push notification and send the push notification to a push notification service. The service provider computers 210 may alternatively provide the display information to the push notification service (e.g., via a request).

The application (e.g., the push notification action engine 102 operating as part of the application) may receive a data message corresponding to the push notification request (e.g., via the operating system forwarding the push notification to the application) the data message may not have been requested. Upon receipt the application may generate, based on a specification and/or layout from the payload of the push notification, display information that is interpretable by rendering features of the operating system. The push notification action engine 102 may then send the display information to the operating system, causing the operating system to display the display information (e.g., in a graphical overlay). The graphical overlay may interrupt any display controller. In the current example, the user is provided buttons that allow him to indicate that the transaction is approved, or alternatively, that the transaction is fraudulent. If the user indicates that the transaction is approved, the push notification action engine 102 may send data related to the indication to a remote server to enable the transaction to be completed. In another example, if the user indicates that the transaction is fraudulent, the push notification action engine 102 may send data related to the indication to the remote server to enable the transaction to be restricted from being completed. The receipt of the indication by the remote server may cause one or more workflows to be performed by the remote server.

As a further non-limiting example, the service provider computers 210 of FIG. 2 may comprise server computing resources of an electronic marketplace. The service provider computers 210 may determine that a user should be prompted to determine whether or not the user was happy with a recently-purchased item. The service provider computers 210 may determine that a threshold period of time has elapsed since the user has ordered and/or received an item. Accordingly, the service provider computers 210 may provide display information (e.g., textual description describing the item, a title, an image of the item, and two buttons such as a selectable "thumbs up" button, and a selectable "thumbs down" button). In at least one example, the service provider computers 210 may embed the display information in the structured data payload of a push notification and send the push notification to a push notification service. The service provider computers 210 may alternatively provide the display information to the push notification service (e.g., via a request).

In a similar manner as described in the previous example, the user will be provided the text, image, and thumbs up/thumbs down buttons (e.g., via a graphical overlay). If the user selects either the thumbs up or thumbs down button, the push notification action engine 102 may send data related to the selection to a remote server to enable the user input to be recorded. In at least one example, a thumbs down indication may prompt another data message to be sent to the client device. In some cases this subsequent data message may include a customer service message and/or quality control message and user interface components to allow the user to perform one or more actions from a corresponding graphical overlay. The thumbs up/thumbs down buttons may further be used for any suitable example that is premised on a good versus bad assessment by the user (e.g., do you like notifications of this topic?).

Continuing on with the example in which the service provider is an electronic marketplace. The service provider computers 210 may determine that a user should be prompted to determine whether or not the user would like to enter a review of a previously-purchased item. The service provider computers 210 may determine that, for example, a threshold period of time has elapsed since the user has ordered and/or received the item. Accordingly, the service provider computers 210 may provide display information (e.g., textual description describing the item, a title, an image of the item, and two buttons such as a selectable "No, thanks" button, and a selectable "Give a Review" button). In a similar manner as described in the previous example, the user will be provided the display information (e.g., via a graphical overlay). The user may then opt out by selecting the "No, thanks" button (resulting in the graphical overlay being dismissed and focus/control of the display being returned to the previously-controlling application). However, the user may indicate that he would like to give a review by selecting the "Give a Review" button of the graphical overlay. In this case the user input may be received by the push notification action engine 102. The push notification action engine 102 may cause additional display information to be generated (e.g., a text box for input a text-based review, a "submit" button, icons corresponding to a number of stars or a range). The push notification action engine 102 may cause this subsequent display information to be displayed to the user in a subsequent graphical overlay. The user may then, via a graphical user interface component of the graphical overlay, enter in his review of the item, select one or more of the selectable stars, and select the "submit" button to submit his input. The push notification action engine 102 may then determine a service call (e.g., corresponding to submitting review information) and may execute the service call in order to cause a remote server to perform a number of operations related to recording and/or displaying a review of an item (e.g., on a network page managed by the electronic marketplace).

Continuing on with the example in which the service provider is an electronic marketplace. The service provider may offer specific-purpose devices that are configured to allow a user (e.g., by selecting a button on a small, magnetic device) that sends wireless information to the service provider computers 210 indicating that a specific item needs to be reordered according to a past order. For example, a user may have a small device that includes a button. The device may correspond specifically to laundry detergent that the user often orders via the electronic marketplace. The user, upon discovering that he is low on laundry detergent, may press the button on the device. Data may be sent from the device to the service provider computers 210. The service provider computers 210 may, in the manner described above, provide display information (e.g., a title, a description, an image, an item description, a price, an edit box, an up arrow button, a down arrow button, a plus button, a minus buttons, etc). The display information may be provided by the push notification action engine 102 to the operating system. Upon rendering the display information, the user may be provided with the ability to adjust a quantity of the item to be ordered. For example, by default a single item may be ordered. The user may select a graphical user interface component of a graphical overlay, for example, the up arrow button to indicate an increase in quantity (e.g., that two of the item should be ordered, etc.). Alternatively, the quantity may be defaulted to indicate that five of the item should be ordered, the user may select a down button to decrease the quantity to two items. Upon submitting the information, the push notification action engine 102 may execute a service call to cause a commercial transaction to be completed by the remote server.

Continuing on with the example in which the service provider is an electronic marketplace. In some examples, the user may be prompted for authentication information. For example, The service provider computers 210 may, in the manner described above, provide display information (e.g., a title, a description, an image, an item description, a price, an edit box, an up arrow button, a down arrow button, a plus button, a minus buttons, etc). The display information may be provided by the push notification action engine 102 to the operating system. Upon rendering the display information (e.g., via a graphical overlay), the user may be provided with an option to purchase a product. Upon selecting a user interface component corresponding to the purchase option, the push notification action engine 102 may determine that the user has not been authenticated. The push notification action engine 102 may provide rendering information to the operating system that enables the operating system to provide a subsequent graphical overlay. The subsequent graphical overlay may enable the user to enter in authentication information (e.g., a username, password, pin, biometric information, etc.). The push notification action engine 102 may receive the authentication information and authenticate the user based on, for example, stored authentication information (e.g., stored in user profile data store 306). The push notification action engine 102 may execute a service call to cause a commercial transaction to be completed by a remote server. In some examples, the execution of the service call may depend on the user being authenticated with the authentication information.

As a further non-limiting example, the service provider computers 210 of FIG. 2 may comprise server computing resources of a polling service (e.g., a voting service). The service provider computers 210 may determine that a user should be prompted to determine who the user intends on voting for in an upcoming election. Accordingly, the service provider computers 210 may provide display information (e.g., textual description describing the candidates, a title, an image, and an edit box to provide the candidate's name or buttons corresponding to each candidate, a button to opt out/dismiss the graphical overlay). In a similar manner as described above, the user will be provided the display information (e.g., via a graphical overlay). The user may then provide their voting indication and the push notification action engine 102 may provide the voting indication, or information related to the voting indication to a remote server. In some cases, the user may opt out, or otherwise dismiss, the graphical overlay. If the user opts out of the receiving future voting-type push notifications (or perhaps opts out of the topic that the voting-type push notifications were being sent) the push notification action engine 102 may send the data to the remote server, where the remote server may perform operations including removing the user from a subscription to voting-type push notifications (and/or a topic category).

As a further non-limiting example, the service provider computers 210 of FIG. 2 may comprise server computing resources of a movie theatre company. The service provider computers 210 may determine that a user device is located near a specific movie theatre (e.g., utilizing GPS coordinate of the user device, upon crossing of the user device of a geofence perimeter, upon connection of the user device to wireless network, utilizing cellular triangulation, etc.). Accordingly, the service provider computers 210 may provide display information (e.g., textual description describing movies playing at the theater, a title, an image, a "Buy Tickets", and a "No, Thanks" button). In a similar manner as described above, the user will be provided the display information (e.g., via a graphical overlay). The user may then use the graphical user interface components of the graphical overlay and of the subsequent graphical overlays to purchase tickets for a movie playing nearby.

Continuing on with the example in which the service provider is a movie theatre company. The service provider computers 210 may determine that a user device is departing a specific movie theatre (and potentially that the user has previously purchased tickets to a particular movie) utilizing GPS coordinate of the user device, utilizing a geofence perimeter, utilizing wireless network identification techniques, utilizing cellular triangulation information, and the like. Accordingly, the service provider computers 210 may provide display information such as display information similar to that discussed above with respect to prompting the user for a review, selecting a thumbs up/thumbs down button, providing a rating (e.g., via selecting a number of stars) or any suitable interaction described herein. The user may then use the graphical user interface components of the graphical overlay and of the subsequent graphical overlays to inform the service provider computers 210 of information associated with the user and the movie.

Figure 11:
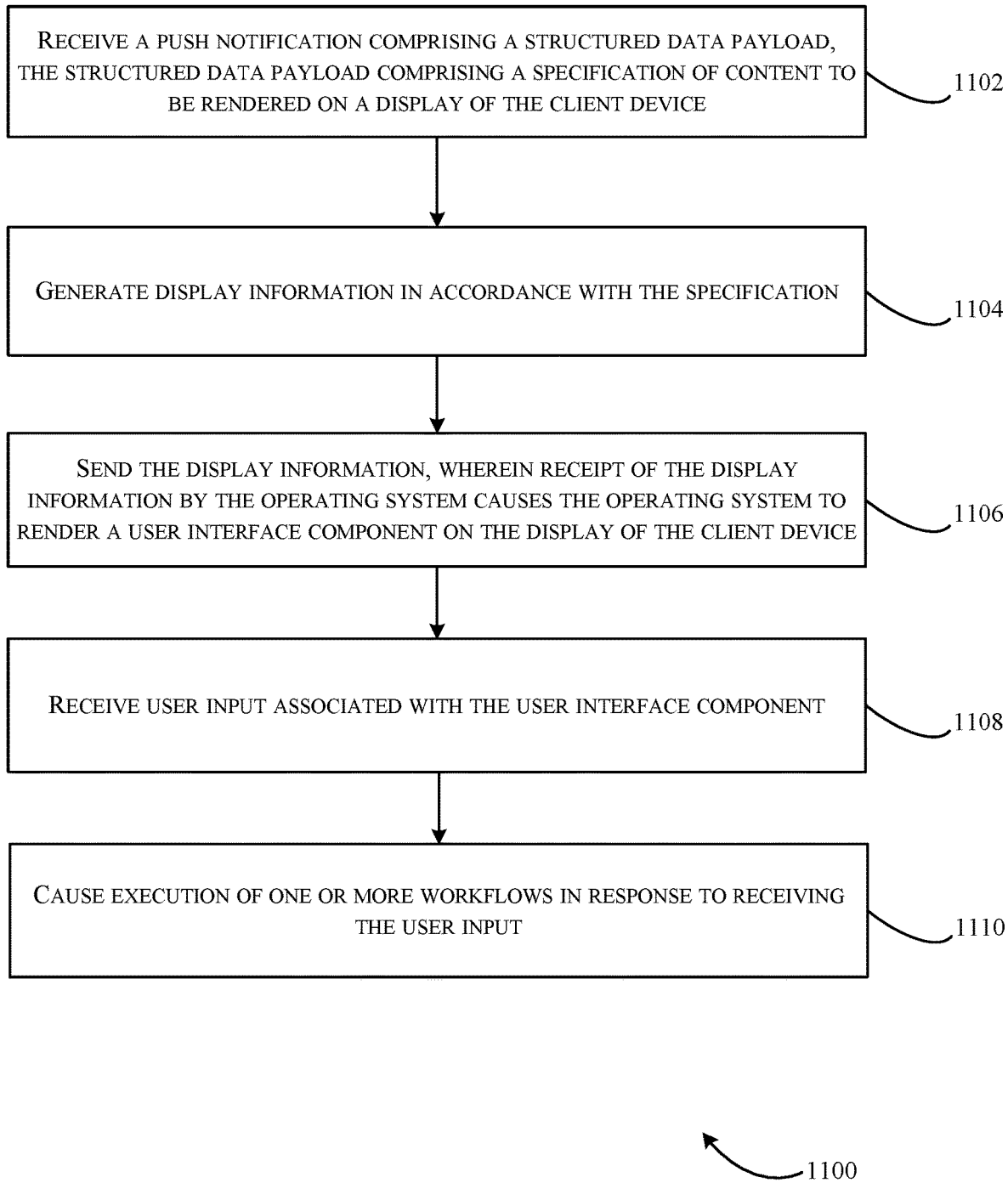
FIG. 11 is a flowchart illustrating another example method for providing customized user interface components in a graphical overlay utilizing the push notification action engine, in accordance with at least one embodiment.

FIG. 11 is a flowchart illustrating another example method 1100 for providing customized user interface components in a graphical overlay utilizing the push notification action engine (e.g., the push notification action engine 102 of FIG. 3), in accordance with at least one embodiment. The method 1100 may begin at block 1102, where the push notification action engine 102 (part of an application of the client device) receives a non-requested data message (e.g., a push notification received by the input processing engine 310 of FIG. 3).

At block 1104, the push notification action engine 102 may generate, display information in accordance with the specification. The display information may configured to cause an operating system of the mobile device to render at least one user interface component that triggers an action in response to user input. The specification defines the action to be taken in response to the user input.

At block 1106, the push notification action engine 102 may send the display information to the operating system. The receipt of the display information by the operating system may cause the operating system to render the at least one user interface component (e.g., a graphical overlay, a graphical user interface components of a graphical overlay, etc.) on the display of the mobile device.

At block 1108, the push notification action engine 102 may receive user input associated with the at least one user interface component. For example, the user interface components presented by the operating system (e.g., via the graphical overlay) may include a button, or edit box, or any suitable user interface component configured to enable interaction with the user. The user may, for example, select a button (e.g., a "buy now") button. The selection may comprise the whole of the user input, or the selection and/or additionally submitted information (e.g., text, a number, etc.) may be included in the user input.

At block 1110, the push notification action engine 102, may execute the service call by the application. The execution of the service call may cause one or more workflows to be executed in response to receiving the user input.

Figure 12:
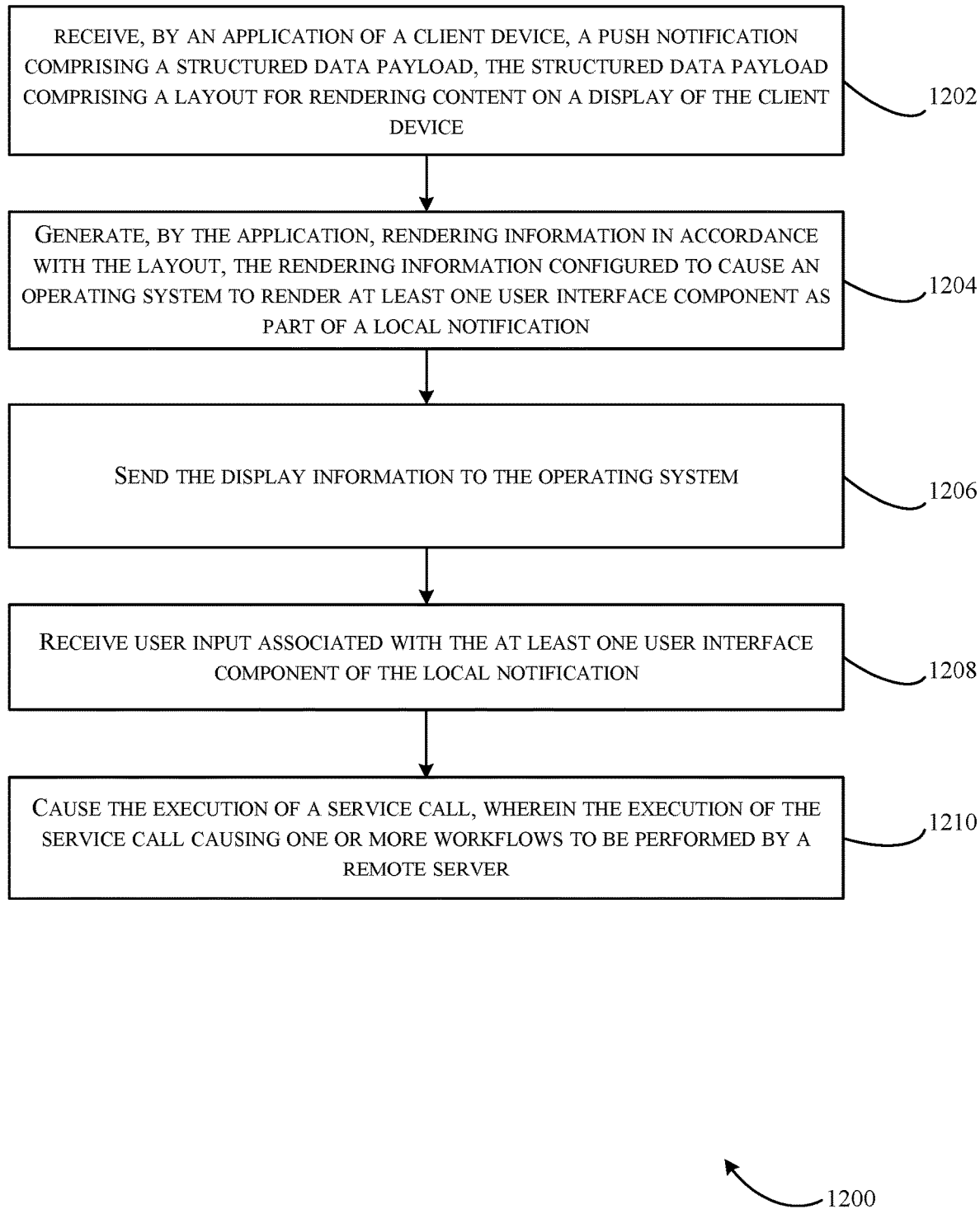
FIG. 12 is a flowchart illustrating still one further example method for providing customized user interface components in a graphical overlay, utilizing the push notification action engine, in accordance with at least one embodiment.

FIG. 12 is a flowchart illustrating still one further example method 1200 for providing customized user interface components in a graphical overlay utilizing the push notification action engine (e.g., the push notification action engine 102 of FIG. 3), in accordance with at least one embodiment. The method 1200 may begin at block 1202, where the push notification action engine 102 (part of an application of the client device) receives a non-requested data message (e.g., a push notification received by the input processing engine 310 of FIG. 3). In at least one example, the data message may comprise a structured data payload. The structured data payload that comprises a specification of a graphical layout for rendering content on a display of a mobile device.

At block 1204, the push notification action engine 102 may generate, rendering information in accordance with the specified graphical layout. The display information may configured to cause an operating system of the mobile device to render at least one user interface component to cause an operating system to render at least one user interface component as part of a graphical overlay.

At block 1206, a component of the push notification action engine 102 (e.g., the rendering engine 312 of FIG. 3) may send the display information to the operating system. The receipt of the display information by the operating system may cause the operating system to render the at least one user interface component on the display of the mobile device (e.g., using a graphical overlay). The graphical overlay may comprise a pop-up or other interruption that can be displayed on a portion of the device display. The graphical overlay may interrupt a standard mode of operation in which an single application on the mobile device controls the display at any given time. The focus of the display may shift from the controlling application to the graphical overlay. Additionally, in some cases, the focus of the display may be locked to the graphical overlay until the user has dismissed, or otherwise acknowledged/interacted, with the graphical overlay.

At block 1208, the push notification action engine 102 may receive user input associated with the at least one user interface component. At block 1210, the push notification action engine 102, may cause the execution of a service call by the application. The execution of the service call may cause one or more workflows to be performed by a remote server.

Figure 13:
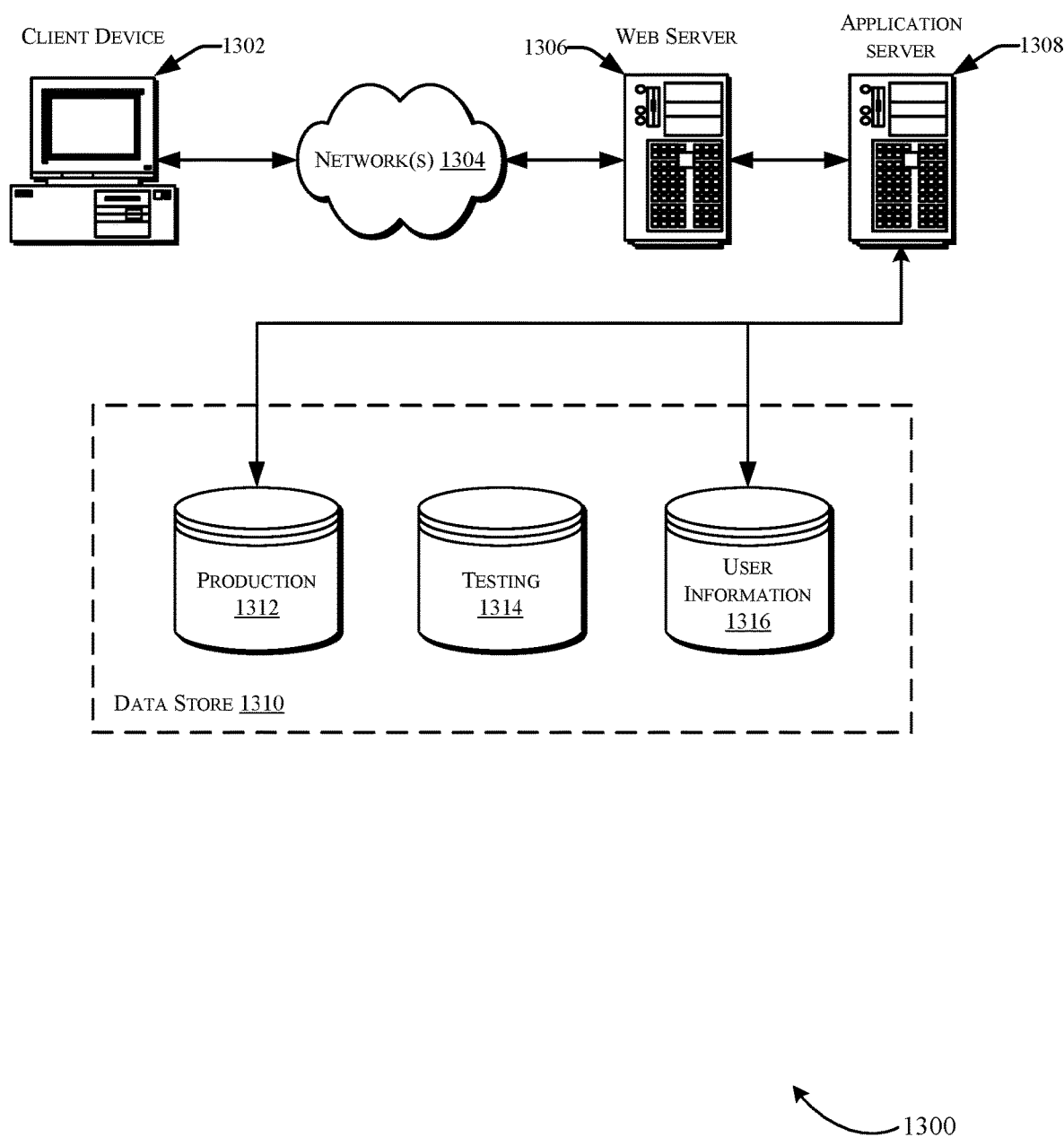
FIG. 13 is a schematic diagram illustrating an example environment for implementing aspects in accordance with at least one embodiment described herein.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes a user device 1302 (e.g., an electronic client device), which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1302 and the at least one application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the at least one application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    providing, by an application executing at a mobile device, a graphical user interface at a display of the mobile device while the application is operating as a foreground process actively controlling the display;
    transitioning, by the application, to operate as a background process, the transitioning causing the application to relinquish control of the display to another application, wherein the graphical user interface of the application is suppressed from being displayed while the application operates as the background process;
    receiving, by the application while executing as the background process from an operating system of the mobile device, a push notification, the push notification including a structured data payload that comprises a specification of a graphical layout for rendering content on a display of the mobile device;
    generating, by the application while executing as a background process, rendering information for the operating system based on interpreting the structured data payload of the push notification received from the operating system, the rendering information being formatted by the application in accordance with the specification of the structured data payload of the push notification, wherein the specification defines a plurality of services calls to be executed in response to receiving a plurality of corresponding user input;
    sending, by the application to the operating system while the application executes as the background process, the rendering information generated by the application and formatted in accordance with the specification, wherein receipt of the rendering information by the operating system causes the operating system to render the at least one user interface component on the display of the mobile device;

receiving, by the application from the operating system, user input associated with the at least one user interface component;

selecting, by the application, a service call from the plurality of service calls defined in the specification, the service call being selected from the plurality of service calls based at least in part on the specification and the user input; and executing, by the application, the service call selected by the application from the specification, the execution of the service call causing one or more workflows to be executed on a remote server corresponding to the service call identified.

2. The computer-implemented method of claim 1, wherein the specification of the graphical layout for rendering content on the display of the mobile device is provided by the remote server, and wherein the push notification is received by the operating system from the remote server.

3. The computer-implemented method of claim 1, wherein the structured data payload includes one or more fields, the one or more fields comprising at least one of an image identifier field, an action identifier field, a title field, a descriptive text field, a price field, a valued-customer indicator field, an availability field, a rating field, a rating count field, or an optional indicator field.

4. The computer-implemented method of claim 1, further comprising:

determining, by the application, that a user of the mobile device is unauthenticated;

generating, by the application, further rendering information configured to cause the operating system of the mobile device to render an additional user interface component that enables the user to enter authentication information;

receiving authentication information submitted using the additional user interface component; and authenticating the user based at least in part on the authentication information, wherein the service call is executed by the application in response to authenticating the user.

5. The computer-implemented method of claim 1, wherein rendering the at least one user interface component utilizes a local operating system call, the local operating system call being triggered by the application subsequent to generating the rendering information for the operating system.

6. The computer-implemented method of claim 1, further comprising:

identifying, by the application, additional display information based at least in part of the user input, the additional display information being identified utilizing data that is different from the structured data payload;

sending, by the application to the operating system, the additional display information, wherein receipt of the additional display information by the operating system causes the operating system to render an additional at least one user interface component on the display of the mobile device;

receiving, by the application, additional user input associated with the additional at least one user interface component;

authenticating a user of the mobile device based at least in part on the additional user input, wherein executing the service call by the application is based at least in part on authenticating the user.

7. The computer-implemented method of claim 1, wherein service call relates to an action is to be performed at the remote server, the remote server being associated with an electronic marketplace, and wherein execution of the service call triggers the action to be performed by the remote server through execution of the one or more workflows.

8. The computer-implemented method of claim 1, wherein the application continues to execute as the background process, and wherein another process executing on the mobile device has active control of the display while the application executes as the background process.

9. A computer-implemented method, comprising:

providing, by an application executing at a client device, a graphical user interface at a display of the client device while the application is operating as a foreground process actively controlling the display;

transitioning, by the application, to operate as a background process, the transitioning causing the application to relinquish control of the display, wherein the graphical user interface is suppressed from being displayed while the application operates as the background process;

receiving, by the application while operating as the background process from an operation system of the client device, a push notification comprising a structured data payload, the structured data payload comprising a specification for content to be rendered on a display of the client device;

generating, by the application while operating as the background process, rendering information for the operating system based on interpreting the structured data payload of the push notification received from the operating system, the rendering information being interpretable by an operating system of the client device and formatted by the application in accordance with the specification;

sending, from the application to the operating system, the rendering information generated by the application, wherein receipt of the rendering information by the operating system causes the operating system to render a user interface component on the display of the client device using the rendering information while the application continues to operate as the background process;

receiving, by the application from the operating system, user input associated with the user interface component; and causing execution of one or more service calls in response to receiving the user input, the specification defining a plurality of service calls from which the one or more service calls are identified based at least in part on the user input.

10. The computer-implemented method of claim 9, wherein the content to be rendered on the display of the client device comprises at least one of an image, a string of text, or a selectable graphical element.

11. The computer-implemented method of claim 9, further comprising retrieving, by the application, a portion of the content specified in the structured data payload, wherein the rendering information is generated by the application to include the portion of the content retrieved.

12. The computer-implemented method of claim 9, wherein causing the user interface component to be rendered on the display by the operating system occurs while the application is lacking primary control of the display.

13. The computer-implemented method of claim 9, wherein the application is a background application executing in a background process and causing the user interface component to be rendered changes a focus of the display from a graphical user interface component caused or maintained by a foreground application to a graphical user interface caused or maintained by the background application.

14. The computer-implemented method of claim 9, wherein causing the user interface component to be rendered usurps control of the display by another application and provides the operating system control of a portion of the display.

15. A mobile device, comprising:
one or more processors;
one or more memory devices storing computer-executable instructions, wherein execution of the instructions causes the one or more processors of the mobile device to, at least;
receive, by an application of the mobile device from an operating system of the mobile device, a push notification including a specification of a graphical layout for rendering content on the display of the mobile device, the application operating as a background process that, while operating as a background process, lacks control of a display of the mobile device, the application having a graphical user interface that is suppressed from being displayed while the application operates as a background process;
generate, by the application while operating as the background process, rendering information for the operating system, the rendering information being formatted by the application in accordance with the specification of the graphical layout, the rendering information being generated by the application to be interpretable by the operating system of the mobile device;
send, by the application while operating as the background process, the rendering information generated by the application to the operating system causing the operating system to utilize the rendering information generated by the application to render at least one user interface component of a graphical overlay;
receive, by the application while operating as the background process, user input associated with the at least one user interface component of the graphical overlay; and
cause, by the application while operating as the background process, the execution of a service call in response to the user input, wherein the execution causes one or more workflows to be performed by a remote server, and wherein the specification defines a plurality of service calls from which the service call is selected based at least in part on the user input.

16. The mobile device of claim 15, wherein the graphical overlay is displayed responsive to instructions executed by the application.

17. The mobile device of claim 15, wherein the graphical overlay interrupts a primary mode of operation with respect to display control.

18. The mobile device of claim 15, wherein the graphical overlay is displayed until a user of the mobile device interacts with the graphical overlay.

19. The mobile device of claim 15, wherein control of the display is maintained by the operating system until interaction by a user with the graphical overlay.

\* \* \* \* \*